United States Patent
Kim et al.

(10) Patent No.: US 9,817,305 B2
(45) Date of Patent: Nov. 14, 2017

(54) IMAGE CORRECTION SYSTEM AND METHOD FOR MULTI-PROJECTION

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

(*) Notice: Subject to any disclaimer, the term of this patent is extended or adjusted under 35 U.S.C. 154(b) by 368 days.

(21) Appl. No.: 13/934,809

(22) Filed: Jul. 3, 2013

(65) Prior Publication Data
US 2014/0016041 A1 Jan. 16, 2014

(30) Foreign Application Priority Data

Jul. 12, 2012 (KR) .................. 10-2012-0076100
Nov. 16, 2012 (KR) .................. 10-2012-0130112

(51) Int. Cl.
| | |
|---|---|
| G03B 21/53 | (2006.01) |
| G03B 21/60 | (2014.01) |
| H04N 9/31 | (2006.01) |
| G03B 37/04 | (2006.01) |
| G03B 21/00 | (2006.01) |

(52) U.S. Cl.
CPC .......... *G03B 21/53* (2013.01); *G03B 21/005* (2013.01); *G03B 21/60* (2013.01); *G03B 37/04* (2013.01); *H04N 9/3147* (2013.01); *H04N 9/3182* (2013.01); *H04N 9/3194* (2013.01)

(58) Field of Classification Search
CPC .. H04N 9/3147; H04N 9/3182; H04N 9/3142; H04N 9/3187; H04N 9/3194; H04N 9/3185; E04H 3/22; G03B 21/60; G09G 5/14

USPC ........................................ 353/30, 31
See application file for complete search history.

(56) References Cited

U.S. PATENT DOCUMENTS

| | | | |
|---|---|---|---|
| 8,840,250 B1* | 9/2014 | Yao ................. | G01S 17/46 345/633 |
| 2002/0105623 A1 | 8/2002 | Pinhanez | |
| 2002/0135739 A1* | 9/2002 | Standard ............ | E04H 3/22 353/46 |
| 2004/0150795 A1 | 8/2004 | Ishii et al. | |

(Continued)

FOREIGN PATENT DOCUMENTS

| | | |
|---|---|---|
| CN | 1460919 A | 12/2003 |
| DE | 10021981 A1 | 12/2001 |

(Continued)

OTHER PUBLICATIONS

EPO Office Action for European Patent Application No. 13175918.5 which corresponds to the above-identified U.S. application.

(Continued)

*Primary Examiner* — Christina Riddle
*Assistant Examiner* — Christopher Lamb, II
(74) *Attorney, Agent, or Firm* — LRK Patent Law Firm

(57) ABSTRACT

The present invention provides an image correction system and method for multi-projection, the image correction system including a plurality of projection surfaces which are installed in a single theater and a projection device which projects images on the plurality of projection surfaces, in which the images projected by the projection device on the plurality of projection surfaces are corrected based on relative differences in properties of the plurality of projection surfaces.

7 Claims, 5 Drawing Sheets

(56) References Cited

U.S. PATENT DOCUMENTS

| | | | |
|---|---|---|---|
| 2005/0052623 A1 | 3/2005 | Hsiung | |
| 2007/0171377 A1* | 7/2007 | Inoue | G03B 21/56 |
| | | | 353/30 |
| 2008/0013057 A1 | 1/2008 | Bullock | |
| 2009/0115915 A1* | 5/2009 | Steinberg | H04N 9/3194 |
| | | | 348/745 |
| 2010/0309391 A1* | 12/2010 | Plut | H04N 9/3147 |
| | | | 348/756 |
| 2011/0309999 A1* | 12/2011 | Chang | G03B 21/13 |
| | | | 345/1.1 |
| 2013/0141699 A1* | 6/2013 | Yamamoto | G03B 21/206 |
| | | | 353/31 |

FOREIGN PATENT DOCUMENTS

| | | | | |
|---|---|---|---|---|
| EP | 1365597 A2 | 11/2003 | | |
| JP | 2000-122193 A | 4/2000 | | |
| JP | 2005039788 A | 2/2005 | | |
| JP | 2007-147786 A | 6/2007 | | |
| KR | 10-1031062 B1 | 4/2011 | | |
| WO | 98/01841 A1 | 1/1998 | | |
| WO | WO 2012032644 A1 * | 3/2012 | | G03B 21/206 |

OTHER PUBLICATIONS

European Search Report for European Application No. 13175918.5 which corresponds to the above-identified U.S. application.
International Search Report for International Application No. PCT/KR2013/006140 which corresponds to the above-identified U.S. application.

* cited by examiner

IMAGE CORRECTION SYSTEM AND METHOD FOR MULTI-PROJECTION

CROSS-REFERENCE TO RELATED PATENT APPLICATION

This application claims the benefit of Korean Patent Applications No. 10-2012-0076100 filed on Jul. 12, 2012, No. 10-2012-0130112 filed on Nov. 16, 2012, in the Korean Intellectual Property Office, the disclosure of which is incorporated herein in its entirety by reference.

BACKGROUND OF THE INVENTION

1. Field of the Invention

The present invention relates to an image correction system and method for multi-projection and, more particularly, to an image correction system and method for multi-projection which can analyze relative differences in properties of a plurality of projection surfaces provided in a theater for multi-projection and correct images projected on the plurality of projection surfaces so as to offset the analyzed differences in properties.

2. Description of the Related Art

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and glasses equipped with polarizing filters are worn by the audience such that different images are presented to the left and right eyes during watching.

However, these 3D technologies can provide audiences with 3D images, but the audiences just watch the images reproduced on a single screen, which may reduce the involvement in the images. Moreover, the direction of the 3D effect that the audiences feel is limited to the direction of the single screen.

Furthermore, according to the conventional 3D technologies, the audiences must wear glasses equipped with polarizing filters during watching, which may make the audiences feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces are arranged around an auditorium such that synchronized and generally unified images are reproduced on the plurality of projection surfaces, thus providing audiences with the 3D effect and involvement.

Meanwhile, it is necessary to create a unified image on the entire projection surface so as to implement the "multi-projection system". However, the conventional projection systems, which are to simply use a single projection device, do not employ any correction technologies for creating these unified images.

Therefore, there is a need to develop a new correction technology for reproducing a unified image on a plurality of projection and, in particular, a correction technology for creating a unified image even when a plurality of projection surfaces have different properties.

SUMMARY OF THE INVENTION

The present invention has been made in an effort to solve the above-described problems associated with prior art, and an object of the present invention is to provide a new image correction system and method for multi-projection which can reduce heterogeneity of images, which may occur due to relative differences in properties of a plurality of projection surfaces, thus reproducing a unified image on the entire projection surface.

To achieve the above object, an image correction system in accordance with an embodiment of the present invention may comprise: a plurality of projection surfaces which are installed in a single theater; and a projection device which projects images on the plurality of projection surfaces, wherein the images projected by the projection device on the plurality of projection surfaces are corrected based on relative differences in properties of the plurality of projection surfaces.

Here, two or more projection devices may be provided in the theater.

The images projected by the two or more projection devices may be corrected based on a relative difference in chromaticity, a difference in brightness, or a difference in quality of the images projected on the projection surfaces.

The images projected by the two or more projection devices may be corrected based on a relative difference in color, a difference in brightness, a difference in distance, or a difference in reflectivity of the projection surfaces.

The image correction system may further comprise an image management device which corrects the images projected by the two or more projection devices and transmits the corrected images to the respective projection devices.

The image management device may analyze a difference in chromaticity, a difference in brightness, or a difference in quality of the images projected on the plurality of projection surfaces and correct the image of a specific projection device so as to offset the analyzed difference in chromaticity, difference in brightness, or difference in quality.

The image correction system may further comprise an imaging device which takes images projected on the plurality of projection surfaces, and the image management device may analyze the difference in the chromaticity, the difference in the brightness, or the difference in the quality using the imaging device.

The image management device may analyze a difference in color, a difference in brightness, a difference in quality, a difference in distance, or a difference in reflectivity of the projection surfaces and correct the image of a specific projection device so as to offset the analyzed difference in color, difference in brightness, difference in distance, or difference in reflectivity.

The image correction system may further comprise an imaging device which takes images of the plurality of projection surfaces, and the image management device may analyze the difference in the color, the difference in the brightness, or the difference in the reflectivity using the imaging device.

The image correction system may further comprise a distance measurement device which measures a distance between each projection surface and each projection device and the image management device may analyze a difference in distance using the distance measurement device.

The image management device may comprise: a projection surface information management unit which manages information on the relative differences in the properties of the projection surfaces; and an image correction unit which corrects the images projected by the respective projection devices based on the information managed by the projection surface information management unit.

The plurality of projection surfaces may be arranged so as not to be parallel to each other and arranged to surround an auditorium in the theater.

To achieve the above object, an image correction method in accordance with an embodiment of the present invention may comprise the steps of: (a) collecting, at an image management device, property information of a plurality of projection surfaces installed in a single theater; (b) analyzing, at the image management device, information on relative differences in properties of the plurality of projection surfaces; and (c) correcting, at the image management device, images to be projected on the plurality of projection surfaces based on the analyzed information.

The property information in step (a) may comprise chromaticity information, brightness information, or quality information of the images projected on the projection surfaces.

The property information in step (a) may comprise color information, brightness information, distance information, or reflectivity information of the projection surfaces.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an image correction system and method for multi-projection in accordance with embodiments of the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Meanwhile, the term "comprising" specific components is an "open-ended term" that simply means that the corresponding components are present and should not be understood to exclude other additional components.

An image correction system in accordance with an embodiment of the present invention will be described with reference to FIGS. 1 to 5 below.

Figure 1:
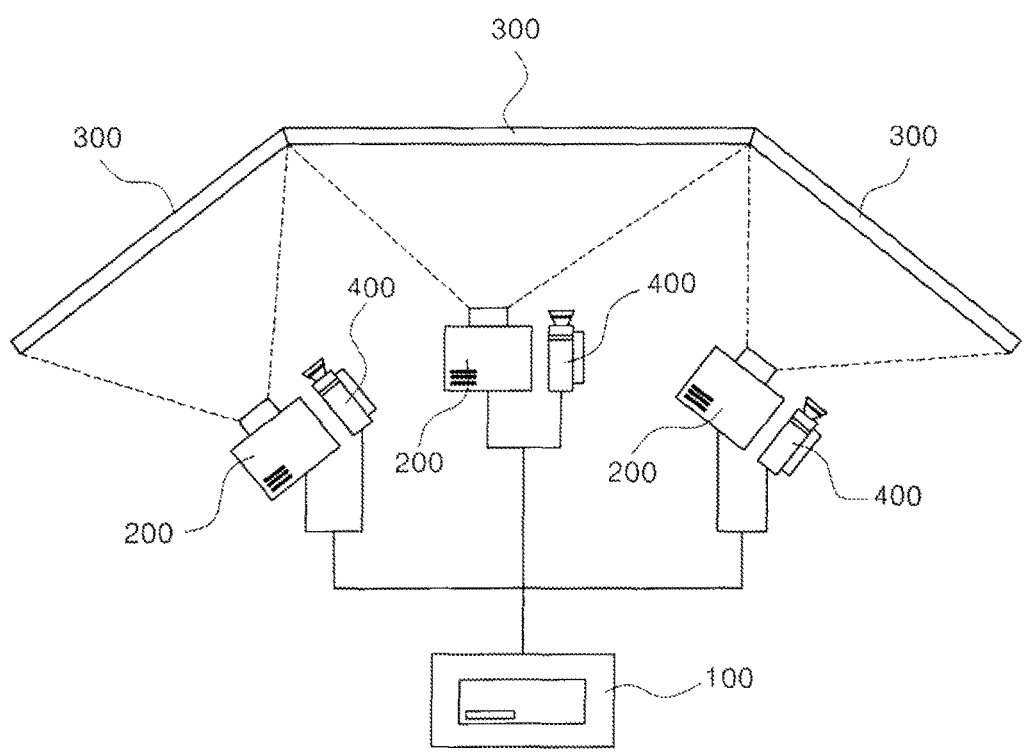
FIG. 1 is a diagram showing the configuration of an image correction system in accordance with an embodiment of the present invention.
Figure 2:
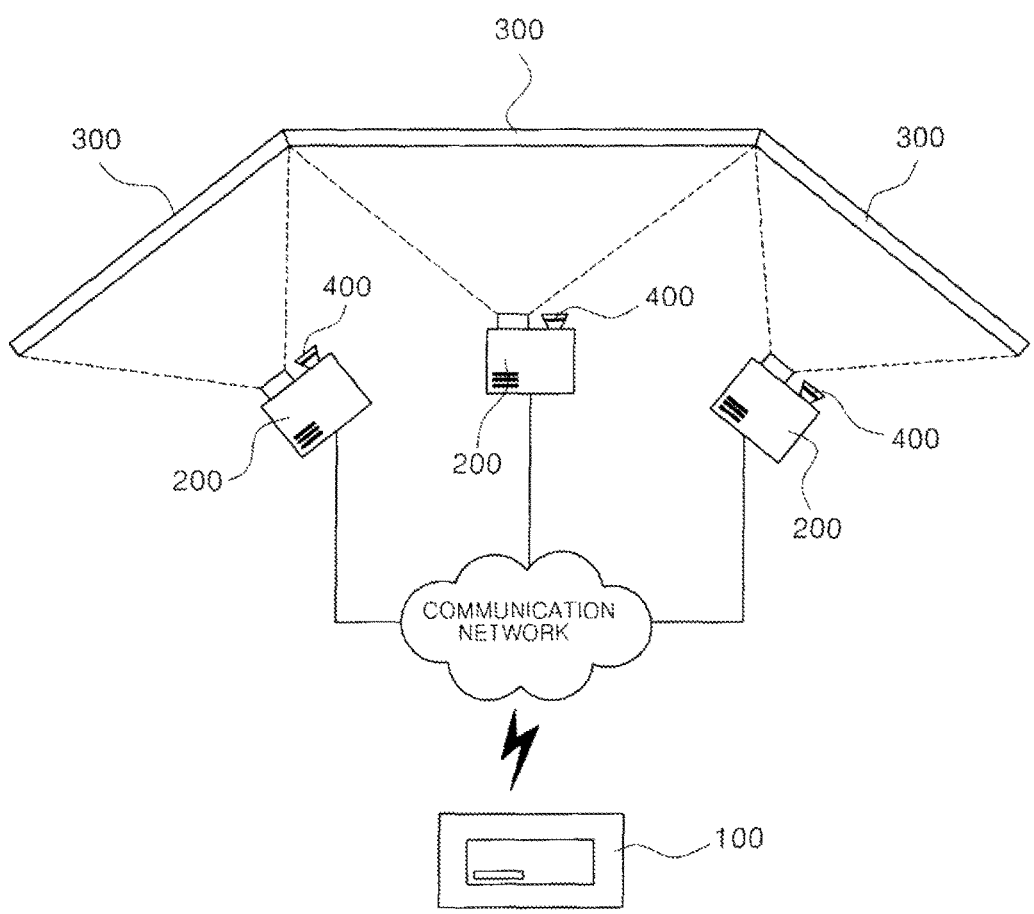
FIG. 2 is a diagram showing the configuration of an image correction system in accordance with another embodiment of the present invention.

Referring to FIGS. 1 and 2, an image correction system in accordance with an embodiment of the present invention may comprise a plurality of projection surfaces 300 which are installed in a single theater, two or more projection devices 200 which project images on the plurality of projection surfaces 300, an image management device 100 which corrects the images projected by the two or more projection devices 200 and transmits the corrected images to the respective projection devices 200, and two or more imaging devices 400 which takes images of the plurality of projection surfaces or images projected on the plurality of projection surfaces.

Moreover, the image correction system in accordance with an embodiment of the present invention may further comprise two or more distance measurement devices which measure the distance between each projection surface 300 and each projection surface 200.

The plurality of projection surfaces 300 are provided in a single theater so as to implement a multi-projection system. A plurality of images projected by the two or more projection devices 200 are reproduced on the plurality of projection surfaces 300. Here, it is preferable that the images reproduced on the plurality of projection surfaces 300 are synchronized with each other. Moreover, it is preferable that the images reproduced on the plurality of projection surfaces 300 generally create a unified image. In detail, while different images are reproduced on the respective projection surfaces 300, it is preferable that the different images create a unified image when viewed over the entire projection surface. Meanwhile, in some embodiments, separate images may be reproduced on the plurality of projection devices.

Moreover, the plurality of projection surfaces 300 may have various properties associated with the image correction and, in particular, have the following properties in two aspects.

The first is the properties of the plurality of projection surfaces 300. As used herein, the properties represent the surface properties of the projection surfaces 300 analyzed in a state where no images are projected on the projection surfaces 300. These properties may include the surface color, surface brightness, and surface reflectivity of each projection surface 300, the distance between the projection surface 300 and the projection device 200, etc.

The second is the properties of the images projected on the plurality of projection surfaces 300. These properties of the images represent the properties of the images which are actually reproduced on the projection surfaces 300, not the properties of the projection surfaces. These properties of the images may include the color, brightness, quality, etc. of the image projected on each projection surface 300.

Meanwhile, the plurality of projection surfaces 300 may comprise various types of projection surfaces such as screens, walls, etc. Here, plurality of projection surfaces 300 may comprise different types of projection surfaces. For example, the plurality of projection surfaces 300 may comprise screens and walls, a combination of different types of screens, or a combination of different types of walls. Moreover, even when the plurality of projection surfaces 300 comprise projection surfaces of the same type, the above-described properties of the projection surfaces 300 may be different from each other due to individual differences in the environment of the respective projection surfaces. In the case where there are differences in the properties even when the plurality of projection surfaces are of different types or the same type, heterogeneous images may be reproduced on the plurality of projection surfaces 300. The reproduction of these heterogeneous images may reduce the audiences' involvement and the 3D effect, which may be an obstacle to the implementation of the multi-projection system. Therefore, it is necessary to offset the relative heterogeneity of images, which may be caused by the differences in the properties of the respective projection surfaces 300. As will be described later, the offsetting of the heterogeneity may be achieved by information analysis and correction of the image management device 100.

The two or more projection devices 200 refer to devices that project images on the plurality of projection surfaces 300. These projection devices 200 may have a heating unit such as an optical system, may project enlarged images on the projection surfaces, and may be implemented in various ways. For example, the projection devices 200 may be implemented by using a cathode ray tube (CRT), using a liquid crystal display (LCD), by digital light processing (DLP) using a digital micromirror device (DMD), by liquid crystal on silicon (LCOS), etc.

Moreover, the two or more projection devices 200 project different images on the plurality of projection surfaces 300 in response to a synchronization signal. Here, it is preferable that the images projected by the two or more projection devices 200 are synchronized with each other such that a single unified image is reproduced on the entire projection surface. Accordingly, the audiences an recognize the unified image in various directions of the respective projection surfaces 300 through the images projected by the two or more projection devices 200, and the 3D effect and involvement that the audiences feel can be increased by such recognition. Meanwhile, separate images may be projected on the plurality of projection surfaces, instead of the unified image, depending on the situations.

Furthermore, it is preferable that the images projected by the two or more projection devices 200 are corrected based on relative differences in properties of the projection surfaces 300. Here, the relative differences in the properties of the projection surfaces 300 may be analyzed in the following two ways. In detail, (1) the relative differences in the properties of the projection surfaces 300 may be analyzed, and (2) the relative differences in the properties of the images projected on the projection surfaces 300 may be analyzed. Accordingly, the image correction based on the relative differences in the properties of the projection surfaces 300 may be performed based on (1) the relative differences in the properties of the projection surfaces 300 (e.g., the relative differences in color, brightness, distance, reflectivity, etc. of the projection surfaces) or (2) the relative differences in the properties of the images projected on the projection surfaces 300 (e.g., the relative differences in chroma, brightness, quality, etc. of the images projected on the projection surfaces).

Meanwhile, the two or more projection devices 200 may be electrically connected to the image management device 100 and integratedly controlled by the image management device 100. Moreover, the two or more projection devices 200 may be connected in parallel to the image management device 100 such that both an integrated control and an individual control are possible. Furthermore, the two or more projection devices 200 may receive images to project from the image management device 100. Here, it is preferable that the images received by the projection devices 200 have been corrected based on the relative differences in the properties of the projection surfaces as described above.

While it is preferable that the number of the projection devices provided is two or more as described above, only a single projection device may be provided in the theater in some embodiments. In this case, the single projection device may comprise a plurality of projection units. Accordingly, the single projection device projects images on all projection surfaces by means of the plurality of projection units.

The two or more imaging devices 400 takes images of the plurality of projection surfaces 300 (i.e., surfaces on which no images are projected) or the images projected on the plurality of projection surfaces 300. It is preferable that these imaging devices 400 are installed to face the plurality of projection surfaces 300 and have a number that can take images of all projection surfaces 300 arranged in the theater. While it is preferable that the number of the imaging devices provided is two or more, only a single imaging device 400 may be provided in the theater in some embodiments. In this case, the single projection device may take images of all projection surfaces by adjusting the imaging angle.

Moreover, the two or more imaging devices 400 may comprise various imaging elements, which take images of the projection surfaces 300 or images projected on the projection surfaces 300, such as a charge coupled device (CCD), complementary metal-oxide semiconductor (CMOS), etc.

Furthermore, the two or more imaging devices 400 may be electrically connected to the image management device 100 and integratedly controlled by the image management device 100. Moreover, the two or more imaging devices 400 may be connected in parallel to the image management device 100 such that both an integrated control and an individual control are possible. Furthermore, the imaging devices 400 may transmit the taken images to the image management device 100 under the control of the image management device 100.

In addition, the two or more imaging devices 400 may be configured independently from the two or more projection devices 200 or configured integrally therewith. In detail, referring to FIGS. 1 and 2, the two or more imaging devices 400 may be configured as independent devices as shown in FIG. 1 or configured integrally with the two or more projection devices 200 as shown in FIG. 2.

Meanwhile, the images take n by the two or more imaging devices 400 are analyzed in an integrated manner, and the relative differences in the properties of the projection surfaces are obtained by such analysis.

The two or more distance measurement devices measure the distance between each projection surface 300 and each projection surface 200. These two or more distance measurement devices may have a number that can measure the distances between all projection surfaces 300 and all projection devices 200 provided in the theater and may be installed in various positions. Moreover, it is preferable that each distance measurement device is formed integrally with each projection device 200 to be measured.

Moreover, the two or more distance measurement devices may measure the distance in various manners. For example, the two or more distance measurement devices may measure the distance between the projection surface 300 and the projection device 200 by analyzing the time required for ultrasonic waves to be emitted and returned, the cycle of ultrasonic waves, or the change in amplitude. Moreover, the two or more distance measurement devices may measure the distance by irradiating an infrared light and detecting the intensity of the reflected light or using laser, GPS, etc.

Meanwhile, the two or more distance measurement devices may measure the distance by two or more methods of ultrasonic, infrared, laser, and GPS at the same time and, in this case, an average of the calculated values is calculated and determined as the final distance.

The distance information measured by the two or more distance measurement devices may be used to analyze the quality of images projected on the respective projection surfaces 300. For example, if the distance between projection surface-A and projection device-a is greater than the distance between projection surface-B and projection device-b, the quality of an image reproduced on projection surface-A may be lower than that of an image reproduced on projection surface-B even if the images have the same resolution (i.e., the unit pixel size of the image projected on projection surface-A may be larger than that of the image projected on projection surface-B). Therefore, the image correction is performed to increase the resolution of the image projected by projection device-a, thus reducing the heterogeneity between the images of projection-A and projection-B.

While it is preferable that the number of the distance measurement devices provided is two or more, a single device may be configured to measure all distances (between all projection devices and all projection surfaces).

The image management device 100 corrects the images projected by the two or more projection devices 200 and transmits the corrected images to the respective projection devices 200.

The image management device 100 may be electrically connected to the two or more projection devices 200, the two or more imaging devices 400, and the two or more distance measurement devices to receive information from the respective devices and analyze the received information in an integrated manner. Moreover, the analyzed information may be used for the image correction. Meanwhile, it is preferable that the image management device 100 is connected in parallel to the respective devices, thus controlling the respective devices individually or integratedly. Moreover, the image management device 100 and the respective devices may be connected via wire or wireless such that the information collected by the respective devices can be transmitted to the image management device 100 or the images corrected by the image management device 100 can be transmitted to the respective projection devices 200.

The process in which the image management device 100 corrects the images of the two or more projection devices will now be described in detail. The image management device 100 performs the image correction based an the relative differences in the properties of the plurality of projection surfaces 300. Here, the image management device 100 may use the relative differences in the properties of the plurality of projection surfaces 300 in the following two ways: (1) the relative differences in the properties of the plurality of projection surfaces 300 may be used; and (2) the relative differences in the properties of the images projected on the plurality of projection surfaces 300 may be used.

These two types of image corrections will be described in detail below.

First, the image management device 100 may correct the images projected by the two or more projection devices 200 based on the differences in the properties of the projection surfaces 300 such as the relative difference in color, the difference in brightness, the difference in distance, the difference in reflectivity, etc. of the projection surfaces 300. In this case, the image management device 100 receives information obtained by the two or more imaging devices 400 and the two or more distance measurement devices, analyzes the received information, and uses the analyzed information in the image correction.

The image correction based on the difference in the color of the projection surfaces 300 will now be described. First, the image management device 100 receives images of the projection surfaces (i.e., the surfaces on which no images are projected) from the two or more imaging devices and analyzes the received images, thus obtaining chromaticity information (including color and chroma) of each projection surface. When the chromaticity information of each projection surface is obtained, the image management device 100 calculates information on difference in chromaticity between the projection surfaces. In detail, the image management device 100 calculates the information on the relative difference in the chromaticity between the projection surfaces after setting a single reference projection surface. For example, the information on the relative difference in the chromaticity is calculated in such a manner that "projection surface-A has a red (R) color level 50 higher than that of the reference projection surface, a green (G) color level 40 higher than that of the reference projection surface, and a blue (B) color level the same as that of the reference projection surface". After the information on the difference in the chromaticity of the respective projection surfaces is calculated in this manner, the images are corrected based on the calculated information in such a manner so as to "reduce the R color level of the image projected on projection-A by 50, reduce the G color level by 40, and maintain the B color level", for example. Therefore, the difference in the color of the projection surfaces is offset by the image correction, thus eliminating the heterogeneity of the images which may occur between the images on the projection surfaces.

The image correction based on the difference in the brightness of the projection surfaces 300 will now be described. First, the two or more imaging devices 400 measure the brightness of the plurality of projection surfaces, which are the subjects, and transmits the measured information to the image management device 100. When the brightness information of the projection surfaces is received, the image management device 100 calculates information on the difference in the brightness of the projection surfaces. In detail, the image management device 100 calculates the information on the relative difference in the brightness in such a manner that "projection-A is 50-nit brighter than the reference projection surface and projection-B is 20-nit darker than the reference projection surface", for example. After the information on the difference in the brightness of the respective projection surfaces is calculated, the images are corrected based on the calculated information in such a manner so as to "reduce the brightness of the image projected on projection surface-A to an extent so as to offset the difference in the brightness of 50-nit and increase the brightness of the image projected on projection surface-B to an extent so as to offset the difference in the brightness of 20-nit. Therefore, the difference in the brightness of the projection surfaces is offset by the image correction, thus eliminating the heterogeneity of the images which may occur between the images on the projection surfaces.

The image correction based on the difference in the distance of the projection surfaces 300 will now be described. First, the distance measurement device measures the distance between each projection surface 300 and each projection device 200 and transmits the measured information to the image management device 100. When the distance information of the projection surfaces is received, the image management device 100 calculates information on the difference in the distance of the projection surfaces. In detail, the image management device 100 calculates the information on the relative difference in the distance of the projection surfaces after setting a single reference projection surface. For example, the information on the relative difference in the distance is calculated in such a manner that "the distance between projection surface-A and the projection device for projection surface-A is 2 m longer than that between the reference projection surface and the projection device for the reference projection surface, and the distance between projection surface-B and the projection device for projection surface-B is 1 m shorter than that between the reference projection surface and the projection device for the reference projection surface". After the information on the difference in the distance of the projection surfaces is calculated, the images are corrected based on the calculated information in such a manner so as to "increase the resolution of the image projected on projection surface-A to an extent so as to offset the difference in the distance of 2 m and reduce the resolution of the image projected on projection surface-B to an extent so as to offset the difference in the distance of 1 m" for example. Therefore, the images reproduced on all projection surfaces have the same pixel size, thus creating unified images with the same quality.

The image correction based on the difference in the reflectivity of the projection surfaces 300 will now be described. First, the two or more imaging devices 400 measures the reflectivity of the plurality of projection surfaces and transmits the measured information to the image management device 100. When the reflectivity information of the projection surfaces is received, the image management device 100 calculates information on the difference in the reflectivity of the projection surfaces. In detail, the image management device 100 calculates the information on the relative difference in the reflectivity after setting a single reference projection surface. For example, the information on the relative difference in the reflectivity is calculated in such a manner that "projection surface-A has a reflectivity 10% higher than that of the reference projection surface and projection surface-B has a reflectivity 10% lower than that of the reference projection surface". After the information on the difference in the reflectivity of the respective projection surfaces is calculated in this manner, the images are corrected based on the calculated information in such a manner so as to "increase the brightness of the image projected on projection surface-A to an extent so as to offset the difference in the reflectivity of 20% and reduce the brightness of the image projected on projection surface-B to an extent so as to offset the difference in the reflectivity of 10%", for example. Therefore, the difference in the reflectivity of the projection surfaces is offset by the image correction, thus eliminating the heterogeneity of the images which may occur between the images on the projection surfaces.

Meanwhile, in the above-described embodiments, during the analysis of the relative differences in the properties of the plurality of projection surfaces (such as the difference in color, the difference in brightness, the difference in distance, the difference in reflectivity, etc.), the analysis is based on the difference values with respect to the properties of the reference projection surface, and the images are corrected based on the relative difference values. However, the analysis performed by the present invention is not limited to the use of the reference projection surface and may be performed in various ways. For example, the present invention may calculate representative values (such as mean values, median values, mode values, etc.) with respect to property values of the plurality of projection surfaces (such as the color, brightness, distance, reflectivity, etc.), analyze the relative differences in the properties based on the calculated representative values, and correct the images based on the analyzed information on the differences in the properties.

By way of example for better understanding of the description, the image management device 100 obtains chromaticity information of the respective projection surfaces and calculates a mean value. For example, if the reference projection surface has a red (R) color level of 30, projection surface-A has a red (R) color level of 24, and projection surface-B has a red (R) color level of 28, the image management device 100 calculates a mean value (27.3) of the red (R) color levels of all projection surfaces. Then, the image management device 100 corrects the R color levels of all projection surfaces based on the calculated mean value (27.3). Moreover, the image management device 100 correct green (G) and blue (B) color levels in the same manner. Therefore, the difference in the color of the projection surfaces is offset by the above-described image correction, thus eliminating the heterogeneity of the images which may occur between the images on the projection surfaces.

Meanwhile, in the above-described embodiments, the image management device 100 receives the images of the projection surfaces from the imaging devices 400, analyzes the received images, determines the states of the projection surfaces, and determines the relative properties of the plurality of projection surfaces based on the determination results. However, the determination of the relative properties of the plurality of projection surfaces is not limited to the use of the information received from the imaging devices 400 and may be performed in various ways. For example, detailed information on all theaters (e.g., the number of projection surfaces provided in each theater, the color, brightness, and reflectivity of each projection surface, the distance between each projection surface and each projection device that projects an image on the projection surface, etc.) is stored in a separate database such that the relative properties of the projection surfaces can be determined based on the information stored in the database and the image correction can be performed based on the determination of the relative properties of the projection surfaces.

Next, the image management device 100 may correct the images projected by the two or more projection devices 200 based on the differences in the properties of the images projected on the projection surfaces, such as the relative difference in the chromaticity, the difference in the brightness, or the difference in the quality. That is, the image management device 100 may analyze how the images projected on the plurality of projection surfaces 300 are distorted and correct the images so as to offset the analyzed difference in distortion.

The image correction based on the relative difference in the chromaticity of the images projected on the projection surfaces 300 will now be described. First, the two or more projection devices 200 project test images for property analysis on the plurality of projection surfaces 300. Here, it is preferable that the test images projected by the respective projection devices 200 are all the same and the projection of the test images is performed before the audiences watch a screening. Then, the image management device 100 receives images of the respective projection surfaces taken by the two or more imaging devices and analyzes the received images, thus obtaining chromaticity information of the images of the respective projection surfaces. When the chromaticity information of the images of the respective projection surfaces is obtained, the image management device 100 calculates information on the difference in the chromaticity of the images of the respective projection surfaces. In detail, the image management device 100 calculates the information on the relative difference in the chromaticity of the images of the respective projection surfaces after setting a single reference projection surface. For example, the information on the relative difference in the chromaticity is calculated in such a manner that "the image of projection surface-A has a red (R) color level 10 higher than that of the image of the reference projection surface, a green (G) color level 20 higher than that of the image of the reference projection surface, and a blue (B) color level 30 lower than that of the image of the reference projection surface". After the information on the difference in the chromaticity of the images of the respective projection surfaces is calculated in this manner, the image management device 100 correct images to be actually projected (instead of the test images) using the calculated information in such a manner as to "reduce the R color level of the image projected on projection-A by 10, reduce the G color level by 20, and increase the B color level by 30", for example. Therefore, the difference in the color distortion between the images of the projection surfaces is offset by the image correction, thus eliminating the heterogeneity of the images which may occur between the images on the projection surfaces.

The image correction based on the relative difference in the brightness of the images projected on the projection surfaces 300 will now be described. First, the two or more projection devices 200 project test images for property analysis on the plurality of projection surfaces 300. Here, it is preferable that the test images projected by the respective projection devices 200 are all the same and the projection of the test images is performed before the audiences watch a screening. Then, the image management device 100 receives images of the respective projection surfaces taken by the two or more imaging devices and analyzes the received images, thus obtaining brightness information of the images of the respective projection surfaces. When the brightness information of the images of the respective projection surfaces is obtained, the image management device 100 calculates information on the difference in the brightness of the images of the respective projection surfaces. In detail, the image management device 100 calculates the information on the relative difference in the brightness of the images of the respective projection surfaces after setting a single reference projection surface. For example, the information on the relative difference in the brightness is calculated in such a manner that "the image of projection surface-A is 40-nit brighter than the image of the reference projection surface and the image of projection-B is 30-nit darker than the image of the reference projection surface", for example. After the information on the difference in the brightness of the images of the respective projection surfaces is calculated, the image management device 100 corrects images to be actually projected (instead of the test images) using the calculated information in such a manner as to "reduce the brightness of the image projected on projection surface-A to an extent so as to offset the difference in the brightness of 40-nit and increase the brightness of the image projected on projection surface-B to an extent so as to offset the difference in the brightness of 30-nit", for example. Therefore, the difference in the brightness (distortion) of the images of the projection surfaces is offset by the image correction, thus eliminating the heterogeneity of the images which may occur between the images on the projection surfaces.

The image correction based on the relative difference in the quality of the images projected on the projection surfaces 300 will now be described. First, the two or more projection devices 200 project test images for property analysis on the plurality of projection surfaces 300. Here, it is preferable that the test images projected by the respective projection devices 200 are all the same and the projection of the test images is performed before the audiences watch a screening. Then, the image management device 100 receives images of the respective projection surfaces taken by the two or more imaging devices and analyzes the received images, thus obtaining quality information of the images of the respective projection surfaces, preferably, size information of unit pixels of the images projected on the respective projection surfaces. When the quality information of the images of the respective projection surfaces is obtained, the image management device 100 calculates information on the difference in the quality of the images of the respective projection surfaces. In detail, the image management device 100 calculates the information on the relative difference in the quality of the images of the respective projection surfaces after setting a single reference projection surface. For example, the information on the relative difference in the quality is calculated in such a manner that "the image of projection surface-A has a unit pixel size 2 times that the image of the reference projection surface and the image of projection-B has a unit pixel size ⅓ times that of the image of the reference projection surface", for example. After the information on the difference in the quality of the images of the respective projection surfaces is calculated, the image management device 100 corrects images to be actually projected (instead of the test images) using the calculated information in such a manner as to "reduce the resolution of the image projected on projection surface-A to an extent so as to reduce the unit pixel size by ½ times and increase the resolution of the image projected on projection surface-B to an extent so as to increase the unit pixel size by 3 times", for example. Therefore, the difference in the quality (unit pixel size) of the images of the projection surfaces is offset by the image correction, thus eliminating the heterogeneity of the images which may occur between the images on the projection surfaces.

Meanwhile, in the above-described embodiments, during the analysis of the relative differences in the properties of the images projected on the plurality of projection surfaces (such as the difference in color, the difference in brightness, the difference in quality, etc.), the analysis is based on the difference values with respect to the properties of the reference projection surface, and the images are corrected based on the relative difference values. However, the analysis performed by the present invention is not limited to the use of the reference projection surface and may be performed in various ways. For example, the present invention may calculate representative values (such as mean values, median values, mode values, etc.) with respect to property values of the images projected on the plurality of projection surfaces (such as the color, brightness, distance, etc.), analyze the relative differences in the properties based on the calculated representative values, and correct the images based on the analyzed information on the differences in the properties.

The image management device 100 may correct the images based on the above-described two types of image corrections at the same time. In detail, the image management device 100 may perform a first phase correction based on the differences in the properties of the projection surfaces 300 and a second phase correction based on the differences in the properties of the images projected on the projection surfaces 300 and, in this case, the unity of the images projected on the projection surfaces 300 can be further improved.

Moreover, the image management device 100 may correct the images based on property information of each projection surface 300. In detail, the image management device 100 may correct the image based on individual structure, area, shape, etc. of each projection surface, thus creating an optimized image on each projection surface. For example, the image management device 100 may perform image warping correction based on the individual structure of each projection surface or increase and reduce the resolution of the image based on the individual area of each projection surface.

Furthermore, the image management device 100 may be implemented with various electronic devices and may be implemented in a single electronic device or in such a manner that several electronic devices are interconnected. For example, the image management device 100 may be implemented in a single server or in such a manner that two or more servers are interconnected. Moreover, the image management device 100 may be implemented in such a manner that a server and other electronic devices are interconnected or implemented in arithmetic units other than the server.

Figure 3:
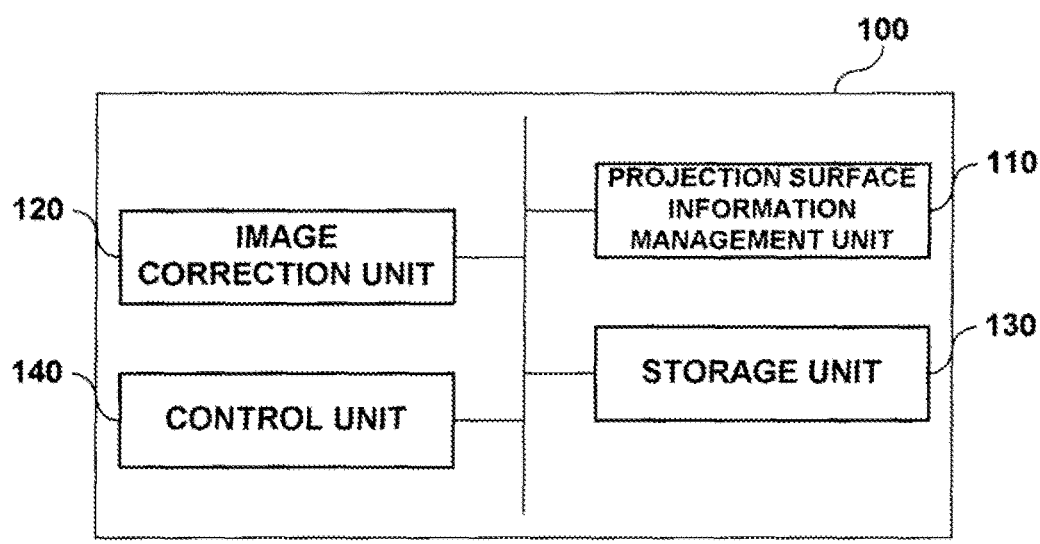
FIG. 3 is a diagram showing the configuration of an image management device included in an image correction system in accordance with an embodiment of the present invention.

Referring to FIG. 3, the image management device 100 may comprise a projection surface information management unit 110 which manages information on relative differences in properties of the projection surfaces, an image correction unit 120 which corrects the images projected by the respective projection devices based on the information managed by the projection surface information management unit 110, a storage unit 130 which store the images corrected by the image correction unit 120, and a control unit 140 which controls the operation of the information managed by the projection surface information management unit, the image correction unit, and the storage unit.

The projection surface information management unit 110 manages the information on the relative differences in the properties of the projection surfaces 300. In detail, the projection surface information management unit 110 receives property information of each projection surface 300 from the two or more imaging device 400 or the two or more distance measurement devices and analyzes the received information, thus obtaining and managing the information on the relative differences in the properties of the projection surfaces 300.

The image correction unit 120 corrects the images projected by the respective projection devices 200 using the information managed by the projection surface information management unit 110. In detail, the image correction unit 120 receives the information on the relative differences in the properties of the projection surfaces 300 from the projection surface information management unit 110 and corrects the images so as to offset the differences in the properties.

Meanwhile, the projection surface information management unit 110 and the image correction unit 120 are configured to perform the projection surface information management operation and the image correction operation of the image management device 100 and thus have been briefly described to avoid repeated description.

The storage unit 130 stores a variety of information related to the operation of the image management device 100, including the information manage by the projection surface information management unit 110 and the images corrected by the image correction unit 120. The storage unit 130 may temporarily or permanently store such information and may be implemented with various memory devices.

The control unit 140 controls various elements of the image management device 100, including the projection surface information management unit 110, the image correction unit 120, and the storage unit 130. The control unit 140 may control various operations of the image management device 100 and may be implemented in various arithmetic units.

Meanwhile, the plurality of projection surfaces 300 may be arranged so as not to be parallel to each other. According to the prior art, an image is projected only on a screen placed in front of a theater such that an audience watches the image reproduced on the two-dimensional screen or a 3D technology is applied to the image itself reproduced on a plane. On the contrary, according to the present invention, the plurality of projection surfaces 300 are three-dimensionally arranged so as not to be parallel to each other, and thus it is possible to provide the audience with a three-dimensional image with high 3D effect and involvement through the three-dimensionally arranged plurality of projection surfaces 300 without applying the 3D technology to the image itself.

Moreover, it is preferable that the plurality of projection surfaces 300 are arranged to surround an auditorium in the theater. Therefore, the audiences can feel as if they are in a space created by the unified image reproduced on the plurality of projection surfaces 300, and thus the three-dimensional effect, involvement, and virtual reality that the audiences feel can be maximized.

Furthermore, the angle between the plurality of projection surfaces is not limited to a specific angle, and the plurality of projection surfaces may be arranged at various angles as long as the audiences can feel the three-dimensional effect.

In addition, the plurality of projection surfaces 300 may be arranged to be adjacent to each other or to be spaced from each other and, even in this case, it is preferable that the plurality of projection surfaces 300 are arranged to surround the auditorium.

Figure 4:
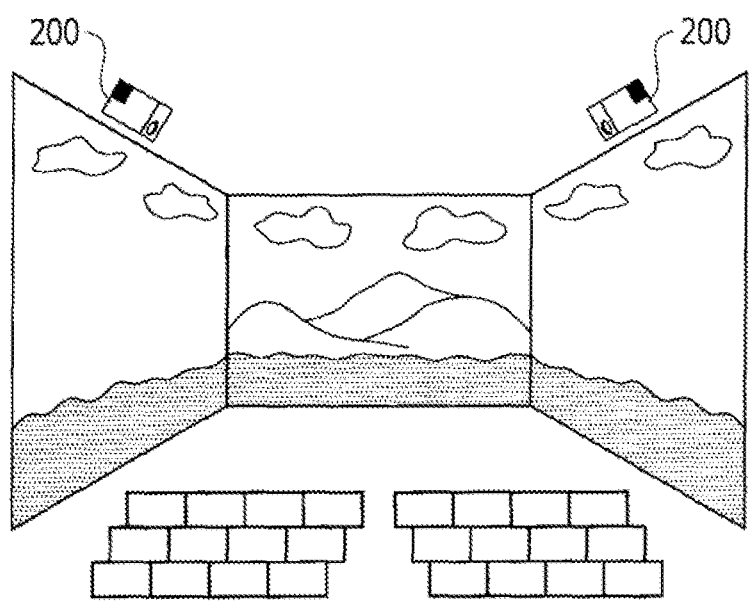
FIGS. 4 to 6 are diagrams showing examples of a plurality of projection surfaces.
Figure 5:
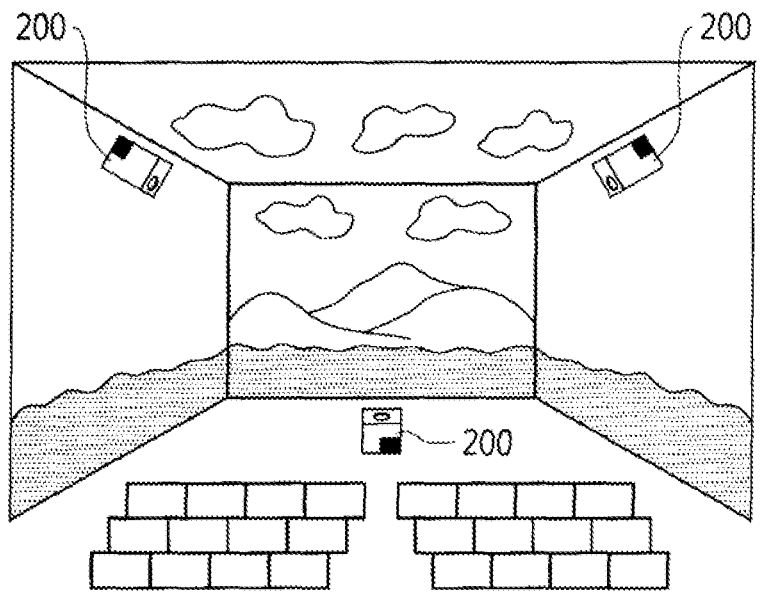
Figure 6:
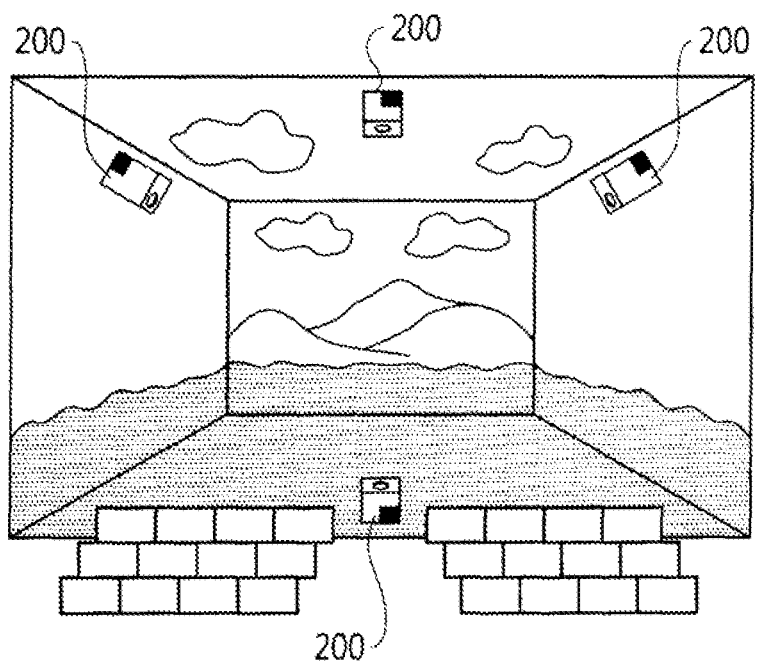

FIG. 4 is a diagram showing an example in which the plurality of projection surfaces are arranged on the front, left, and right sides with respect to the auditorium, FIG. 5 is a diagram showing an example in which the plurality of projection surfaces are arranged on the front, left, right, and top sides with respect to the auditorium, and FIG. 6 is a diagram showing an example in which the plurality of projection surfaces are arranged on the front, left, right, top, and bottom sides with respect to the auditorium.

Next, an image correction method for multi-projection in accordance with an embodiment of the present invention will be described with reference to FIG. 7.

Figure 7:
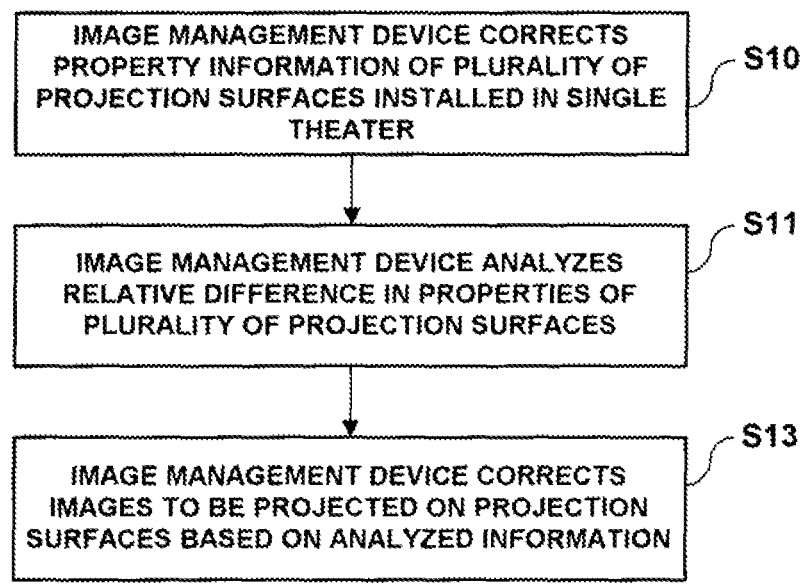
FIG. 7 is a flowchart showing an image correction method in accordance with an embodiment of the present invention.

Referring to FIG. 7, the image correction method for multi-projection in accordance with an embodiment of the present invention may comprise the step of collecting, at an image management device, property information of a plurality of projection surfaces installed in a single theater (S10).

Here, the property information may comprise color information, brightness information, or quality information of the images projected on the projection surfaces.

Moreover, the property information may comprise color information, brightness information, distance information, or reflectivity information of the projection surfaces.

After the step (S10), the image management device analyzes the relative difference in the properties of the plurality of projection surfaces (S11).

Moreover, after the step (S11), the image management device corrects images to be projected on the plurality of projection surfaces based on the analyzed information (S12).

Meanwhile, the image correction method may be implemented in the form of a program and then stored in a readable recording medium of an electronic device or transmitted and received through a communication network. Moreover, the image correction method may be implemented in the form of a program and then temporarily or permanently stored in various electronic devices.

Furthermore, the above-described image correction method according to the present invention may have substantially the same features as the image correction system according to the present invention. Thus, the above-described features associated with the image correction system may be easily adapted and applied to the image correction method.

As described above, according the present invention, even when there are differences in properties between the plurality of projection surfaces, it is possible to reproduce a unified image on the entire projection surface. In detail, it is possible to offset the differences in the properties between the projection surfaces by the image correction, thus reproducing a unified image on the entire projection surface.

Moreover, the present invention can analyze the differences in the properties of the plurality of projection surfaces (such as the difference in color, the difference in brightness, the difference in distance, etc.) or the differences in the properties of the images projected on the plurality of projection surfaces (such as the difference in color, the difference in brightness, the difference in quality, etc.) by directly taking images and can perform the image correction based on the analyzed information. Therefore, it is possible to further increase the accuracy of the image correction, compared to the image correction based on information input from a user or information databased in advance.

Furthermore, the present invention can integratedly manage the images to be projected on the plurality of projection surfaces by means of the image management device. Therefore, during the image correction of a specific projection device, the information on the specific projection device and the information on other projection devices can be considered at the same time.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An image correction system comprising: a plurality of projection surfaces which are comprised of different types of projection surfaces installed in a single theater, and are arranged so as not to be parallel to each other and arranged to surround an auditorium in the theater; a plurality of projection devices which project images on the plurality of projection surfaces, and an image management device which corrects the images projected by the plurality of projection devices and transmits the corrected images to the respective projection devices, wherein the images projected by the projection devices on the plurality of projection surfaces are corrected based on property information of each projection surface including projection surface structure and area, also based on relative differences in properties of the plurality of projection surfaces by reducing differences of relative properties, and also based on a relative difference in chromaticity, a difference in brightness, and a difference in quality of the images projected on the projection surfaces, thereby creating a unified image from the images reproduced on the plurality of projection surfaces, wherein the image management device calculates information on the difference in the chromaticity of the images projected on the projection surfaces and increases or decreases a color level of each of the images projected on the projection surfaces so that the difference in the chromaticity of the images of the projection surfaces is offset, and wherein the image management device calculates information on the difference in the brightness of the images projected on the projection surfaces and increases or decreases a brightness of each of the images projected on the projection surfaces so that the difference in the brightness of the images of the projection surfaces is offset.

2. The image correction system of claim 1, wherein the image management device analyzes a difference in color, a difference in brightness, a difference in quality, a difference in distance, or a difference in reflectivity of the projection surfaces and corrects the image of a specific projection device so as to offset the analyzed difference in chromaticity, difference in brightness, difference in distance, or difference in reflectivity.

3. The image correction system of claim 2, further comprising an imaging device which takes images of the plurality of projection surfaces, wherein the image management device analyzes the difference in the color, the difference in the brightness, or the difference in the reflectivity using the imaging device.

4. The image correction system of claim 2, further comprising a distance measurement device which measures a distance between each projection surface and each projection device and the image management device analyzes a difference in distance using the distance measurement device.

5. The image correction system of claim 1, wherein the image management device comprises:
   a projection surface information management unit which manages information on the relative differences in the properties of the projection surfaces; and
   an image correction unit which corrects the images projected by the respective projection devices based on the information managed by the projection surface information management unit.

6. An image correction method comprising the steps of:
   (a) collecting, at an image management device, property information of a plurality of projection surfaces installed in a single theater;
   (b) analyzing, at the image management device, information on relative differences in properties of the plurality of projection surfaces in a state where no image is projected; and
   (c) correcting, at the image management device, images to be projected on the plurality of projection surfaces based on property information of, each projection surface including projection surface structure and area, also based on relative differences in properties of the plurality of projection surfaces by reducing differences of relative properties, and also based on a relative difference in chromaticity, a difference in brightness, and a difference in quality of the images projected on the projection surfaces, thereby creating a unified image from the images reproduced on the plurality of projection surfaces, wherein the plurality of projection surfaces are comprised of different types of projection surfaces installed in a single theater, wherein the property information in, step (a) comprises color information, brightness information, distance information between projection devices and the projection surfaces, and reflectivity information of the projection surfaces, wherein the image management device calculates the information on the relative difference in chromaticity between the projection surfaces after setting a single reference projection surface and increases or decreases color level of each of the projection surfaces so that the relative difference in the chromaticity is offset, wherein the image management device calculates the information on the relative difference in the brightness between the projection surfaces after setting a single reference projection surface and increases or decreases the brightness so that the relative difference in the brightness is offset, wherein the image management device calculates the information on the relative difference in the distance of the projection surfaces after setting a single reference projection surface and increases or decreases resolution of the images projected on the projection surfaces so that relative difference in the distance is offset, wherein the image management device calculates the information on the relative difference in the reflectivity of the projection surfaces after setting a single reference projection surface and increases or decreases the brightness of the images projected on the projection surfaces so that relative difference in the reflectivity is offset, wherein the image management device calculates information on the difference in the chromaticity of the images of the respective projection surfaces and increases or decreases color level of each of the images projected on the projection surfaces so that the difference in the chromaticity of the images of the projection surfaces is offset, wherein the image management device calculates information on the difference in the brightness of the images projected on the projection surfaces and increases or decreases the brightness of the images projected on the projection surfaces so that the difference in the brightness of the images of the projection surfaces is offset, and wherein the image management device calculates information on the difference in the quality of the images projected on the projection surfaces and increases or decreases resolution of the images projected on the projection surfaces so that the difference in the quality of the images of the projection surfaces is offset.

7. An image correction system comprising: a plurality of projection surfaces which are comprised of different types of projection surfaces installed in a single theater, and are arranged so as not to be parallel to each other and arranged to surround an auditorium in the theater; a plurality of projection devices which project images on the plurality of projection surfaces, an image management device which corrects the images projected by the plurality of projection devices and transmits the corrected images to the respective projection devices; wherein the images projected by the projection devices on the plurality of projection surfaces are corrected based on property information of each projection surface including projection surface structure and area, and also based on relative differences in properties of the plurality of projection surfaces by reducing differences of relative properties, thereby creating a unified image from the images reproduced on the plurality of projection surfaces, wherein the properties of the plurality of projection surfaces include color, brightness, distance between the projection devices and the projection surfaces, and reflectivity, wherein the image management device calculates the information on the relative difference in chromaticity between the projection surfaces after setting a single reference projection surface and increases or decreases a color level of each of the projection surfaces so that the relative difference in the chromaticity is offset, and wherein the image management device calculates the information on the relative difference in the brightness between the projection surfaces after setting a single reference projection surface and increases or decreases the brightness so that the relative difference in the brightness is offset.

* * * * *